United States Patent
Jerolm

(10) Patent No.: US 9,436,212 B2
(45) Date of Patent: Sep. 6, 2016

(54) DATA BUS PART AND METHOD FOR SYNCHRONIZING DATA BUS PARTS

(71) Applicant: WAGO Verwaltungsgesellschaft mbH, Minden (DE)

(72) Inventor: Daniel Jerolm, Bad Essern (DE)

(73) Assignee: WAGO VERWALTUNGSGESELLSCHAFT MBH, Minden (DE)

( * ) Notice: Subject to any disclaimer, the term of this patent is extended or adjusted under 35 U.S.C. 154(b) by 363 days.

(21) Appl. No.: 14/028,590

(22) Filed: Sep. 17, 2013

(65) Prior Publication Data

US 2014/0082399 A1    Mar. 20, 2014

(30) Foreign Application Priority Data

Sep. 17, 2012  (DE) .................. 10 2012 108 696

(51) Int. Cl.
*G06F 1/12* (2006.01)

(52) U.S. Cl.
CPC ...................... *G06F 1/12* (2013.01)

(58) Field of Classification Search
CPC ........... G06F 1/12; G06F 1/08; G04B 47/00; G04C 11/00; G04C 11/04; G04C 11/046; H03D 3/24
USPC ............ 713/401, 400, 600; 368/46, 56, 155, 368/156; 375/376
See application file for complete search history.

(56) References Cited

U.S. PATENT DOCUMENTS

| | | | |
|---|---|---|---|
| 5,661,700 A * | 8/1997 | Weppler | G04G 7/00 368/10 |
| 5,988,846 A | 11/1999 | Flamm et al. | |
| 2002/0002406 A1 | 1/2002 | Bermann et al. | |
| 2005/0105636 A1 | 5/2005 | Belau et al. | |
| 2008/0049884 A1 * | 2/2008 | Kim | H03L 7/0891 375/375 |
| 2012/0008727 A1 * | 1/2012 | Mohajeri | H03L 7/06 375/376 |
| 2012/0286825 A1 | 11/2012 | Baus et al. | |
| 2013/0173949 A1 * | 7/2013 | Cai | G06F 1/04 713/503 |

FOREIGN PATENT DOCUMENTS

| | | |
|---|---|---|
| DE | 196 26 287 | 2/1997 |
| DE | 197 51 302 | 5/1998 |
| DE | 298 09 721 | 2/1999 |
| DE | 198 31 405 | 1/2000 |
| DE | 101 48 878 | 3/2006 |
| DE | 10 2010 000 962 | 7/2011 |
| EP | 1 253 494 | 10/2002 |

OTHER PUBLICATIONS

Dopplinger et al., "Using IEEE 1588 for synchronization of network-connected devices" Freescale Semiconductor, Mar. 2007.

* cited by examiner

*Primary Examiner* — Thomas Lee
(74) *Attorney, Agent, or Firm* — Renner, Otto, Boisselle & Sklar LLP.

(57) ABSTRACT

A data bus part with a data bus interface which has a downstream data bus input for receiving data from a higher-order data bus (1), and a clock generator for generating an internal clock signal for the data bus part, is described. The data bus part has a synchronization unit to synchronize the clock generator with the clock signal of the higher-order data bus part, wherein the synchronization unit is configured to detect transitions in the downstream data stream received at the downstream data input, to regulate the frequency of the internal clock signal depending on the detected transitions, and to set a defined phasing of the internal clock signal in relation to the detected transitions.

7 Claims, 2 Drawing Sheets

DATA BUS PART AND METHOD FOR SYNCHRONIZING DATA BUS PARTS

The invention relates to a data bus part with a data bus interface which has a downstream data bus input for receiving data from a higher-order data bus part and a clock generator for generating an internal clock signal for the data bus part.

The invention furthermore relates to a method for synchronizing data bus parts of this type.

In the transmission and processing of data between data bus parts, the problem of synchronizing the data bus parts often occurs. In practice, the said data bus parts have their own local clock generator which drifts with time, even after being set to a global clock.

PRIOR ART

EP 1 253 494 B1 proposes to link previously free-running processing cycles rigidly to the cycle of a field bus system by prescribing a clock for synchronization. To do this, a synchronization signal generation device is provided which generates a synchronization signal with which the cycles of the field bus system are linked to the processing tasks in the control and regulating device. A synchronization signal is thus provided centrally for all connected data bus parts.

It is also known, e.g. from DE 298 09 721 U1, to feed a synchronization signal in parallel on at least one separate line to all connected parts. However, this requires a separate line connection. Furthermore, propagation delays occur.

The synchronization of local clock generators with a global synchronization clock is also known in U.S. Pat. No. 5,661,700, DE 196 26 287 A1 and DE 198 31 405 A1.

DE 197 51 302 A1 discloses a method for communication control with a main station and secondary stations, in which, without a synchronizing signal line, time data for communication timers in the main station are transmitted together with communication data to the secondary stations in order to synchronize their communication timers. Time data are transmitted from the main station before the transmission of command data. The communication timers of the secondary stations add transmission delay correction data to the received time data. Forwarding delays are therefore compensated for in the preceding stations.

DE 10 2010 000 962 A1 discloses a method for monitoring a frequency signal for data bus parts which are interconnected with a Serial Peripheral Interface (SPI). This SPI allows a bidirectional, synchronous and serial data transmission between a master unit and various slave units. To do this, at least three lines are provided between the master unit and the first slave unit connected thereto for the bidirectional data transmission, i.e. two data lines and one clock line. The line is dispensable if the data lines are used to generate a clock from the edges of the data line. A counter, which can be compared against a counter with an internal clock, is intended to be controlled with this clock.

In DE 101 48 878 B4, a synchronization of transmission clocks of the data transmission and from the satellite system to an evaluation unit is also proposed, wherein the transmission clocks of the satellite systems detected by the evaluation unit are individually synchronized on the basis of a system clock of the evaluation unit. A global system clock of a central evaluation unit is thus provided, which is used for synchronizing all connected parts.

On the basis hereof, the object of the present invention is to produce an improved data bus part and an improved method for synchronizing data bus parts, wherein a reliable and simple synchronization of the interconnected data bus parts exchanging data streams is possible without the need to provide a central system clock or synchronization clock.

DISCLOSURE OF THE INVENTION

The object is achieved with the data bus part with the features of claim 1 and by the method for synchronizing such data bus parts with features of claim 5.

Advantageous embodiments are described in the subclaims.

With a data bus part of the aforementioned type, it is proposed that the data bus part has a synchronization unit for synchronizing a clock generator with the clock signal of the higher-order data bus part. This synchronization unit is then configured to detect transitions in the downstream data stream received at the downstream data bus input, to regulate the frequency of the internal clock signal depending on the detected transitions, and to set a defined phasing of the internal clock signal in relation to the detected transitions.

Transition in the sense of the present invention means each characteristic signal change in the data stream which can be used to synchronize the clock generator with the clock signal of a higher-order data bus part. In practice, these transitions are preferably signal edges of a digital signal in the changeover e.g. from the low signal level to a high signal level, i.e. in the changeover from a digital "zero" to a digital "one" or vice versa. However, other characteristic signal patterns, the signal time of which is determinable with an accuracy required for synchronization, can also be used as transitions.

Characteristic signal changeovers in a downstream data stream which is forwarded from a higher-order data bus part to the present data bus part and is therefore received by the present data bus part are therefore recognized. A defined phasing of the internal clock signal in relation to the detected transitions is then set on the basis of the detected transitions. This means that the time of a characteristic signal changeover in the downstream data stream provides the basis for the synchronization of the clock generator in such a way that the detected time of a transition is assumed as the synchronization time according to which the phasing of the internal clock signal is regulated.

The phasing of the transitions in the downstream data stream in relation to the dedicated clock is thus measured by the synchronization device and the frequency of the internal clock generator is regulated so that this clock generator frequency corresponds as exactly as possible to the clock hidden in the downstream data bus signal and a defined phasing between the edge changeovers in the downstream data bus stream and in the dedicated internal clock is produced. The transitions detected in the downstream data stream are thus used as synchronization information to set the internal clock signal of the clock generator.

Compared with a separate synchronization message or synchronization line, the proposed synchronization, referred to the downstream data stream of a higher-order data bus part, has the advantage that the data bus parts of a more complex system then always synchronize their clock generators in each case with their adjacent preceding bus part and as a result the exact same frequency of the internal clock generators is then set in all data bus parts in a network, independently from the connection and without problems due to propagation time shifts and without a separate synchronization line. Only the phasing between the clocks is not defined due to propagation times on the lines and latencies of data bus parts. Since each data bus part synchronizes the clock of its receiver with the edges in the incoming data stream and the phasing of the clock in the transmitter of the higher-order data bus part plays no part, a dissimilar phase position of the clocks of the data bus parts of a network does not pose a problem.

It is particularly advantageous if the data bus interface is bidirectional and furthermore has an upstream data bus output for transmitting data to a higher-order data bus part. The database part is thus configured not only to receive data from a higher-order data bus part in the downstream data stream but also to transmit data (back) to the higher-order data bus part in the upstream data stream. At least each higher-order data bus part then has a phase position correction unit to detect transitions in the data stream receivable via the upstream data bus input from the directly lower-order data bus part and to delay this upstream data stream depending on the detection in such a way that a defined phasing of the internal clock signal in relation to the transitions of the delayed data stream is set. The phasing correction unit can determine the phasing of the data stream received at the upstream data bus input, e.g. using a delay line, and can output the data stream following a phasing via its upstream data bus output to a higher-order data bus part.

Since the clock frequency of the internal clock generator, i.e. the frequency and phase position of the internal clock signal, is already set to the first downstream data stream, no setting of the clock generator to the upstream data stream also can be achieved for the upstream data stream. It is therefore proposed instead, using the phase position correction unit, to delay the received upstream data stream in the higher-order data bus part, i.e. in the receiver, overall so that a defined phasing between the internal clock signal set on the downstream data stream in relation to the upstream data stream can be set here also. The upstream data stream received by the higher-order data bus part is therefore similarly synchronized with the downstream data stream received by the lower-order data bus part and the clock frequency and phasing of the higher-order data bus part and the lower-order data bus part are aligned with one another for the synchronized transmission and reception of data streams.

The upstream data stream may be delayed, for example, by inserting delay elements or delay data into the upstream data stream. It is advantageous if the data stream is not modified, but rather an electrical transmission delay of the data signal is performed e.g. with series-connected delay elements. Such delay elements may be e.g. Look-Up Tables (LUTs) in an FPGA (Field Programmable Gate Array) or gates in an ASIC (Application-Specific Integrated Circuit). The synchronization unit and the phase position correction unit can either be designed as separate hardware circuits. However, it is also conceivable for the synchronization unit and the phasing correction unit to be implemented as software logic on common or separate hardware platforms, such as microcontrollers, processors or FPGAs.

The synchronization unit and/or the phase correction unit are preferably configured to set a defined phasing in the range from 90° to 270° and preferably in the range from around 180°. The defined phasing should be set so that a sampling of the useful signal can be guaranteed to be as error-free as possible. In the serial data transmission in a data stream, edge steepness, transient phenomena and phase jitter are often to be taken into account, which do not allow a signal sampling immediately after a signal changeover. The most reliable sampling of a serial data signal is therefore ensured precisely in time between the activation of a high and/or low data signal and the de-activation, i.e. precisely between the switchover times or transitions of a data word, corresponding to a phasing of 180°.

In a manner corresponding to the set-up of data bus part, the method for synchronizing data bus parts comprises the following steps:

reception of a downstream data stream from a higher-order data bus part by a lower-order data bus part via a downstream data bus input;

detection of transitions in the downstream data stream received at the downstream data bus input;

synchronization of an internal clock signal of a clock generator of the lower-order data bus part depending on the detected transitions, and setting of a defined phasing of the synchronized internal clock signal in relation to the detected transitions.

For the synchronization of an upstream data stream, the method can advantageously be formed by the following steps:

reception of an upstream data stream from a further lower-order data bus part via an upstream data bus input by a data bus part;

detection of transitions in the upstream data stream received at the upstream data bus input;

delaying of this received upstream data stream depending on the detected transitions in such a way that a defined phasing of the synchronized internal clock signal in relation to the transitions of the delayed upstream data stream is set, and transmission of the delayed upstream data stream via an upstream data bus output to a higher-order data bus part.

Following the delay of the received upstream data stream, the latter is synchronized with the data bus part and can be sampled and used or further processed by the data bus part.

It is particularly advantageous if no delay data are inserted into the upstream data stream for its delay, but purely electrical delay elements, such as e.g. LUTs (Look-Up Tables) in an FPGA (Field Programmable Gate Array) are used. All hardware solutions which do not modify the data stream itself, but delay it by its propagation delay are suitable as delay elements. A plurality of the delay elements should be available and the propagation delays of the delay elements should be roughly equal.

The invention is explained in detail below with reference to an example embodiment with the attached drawings. In the drawings.

Figure 1:
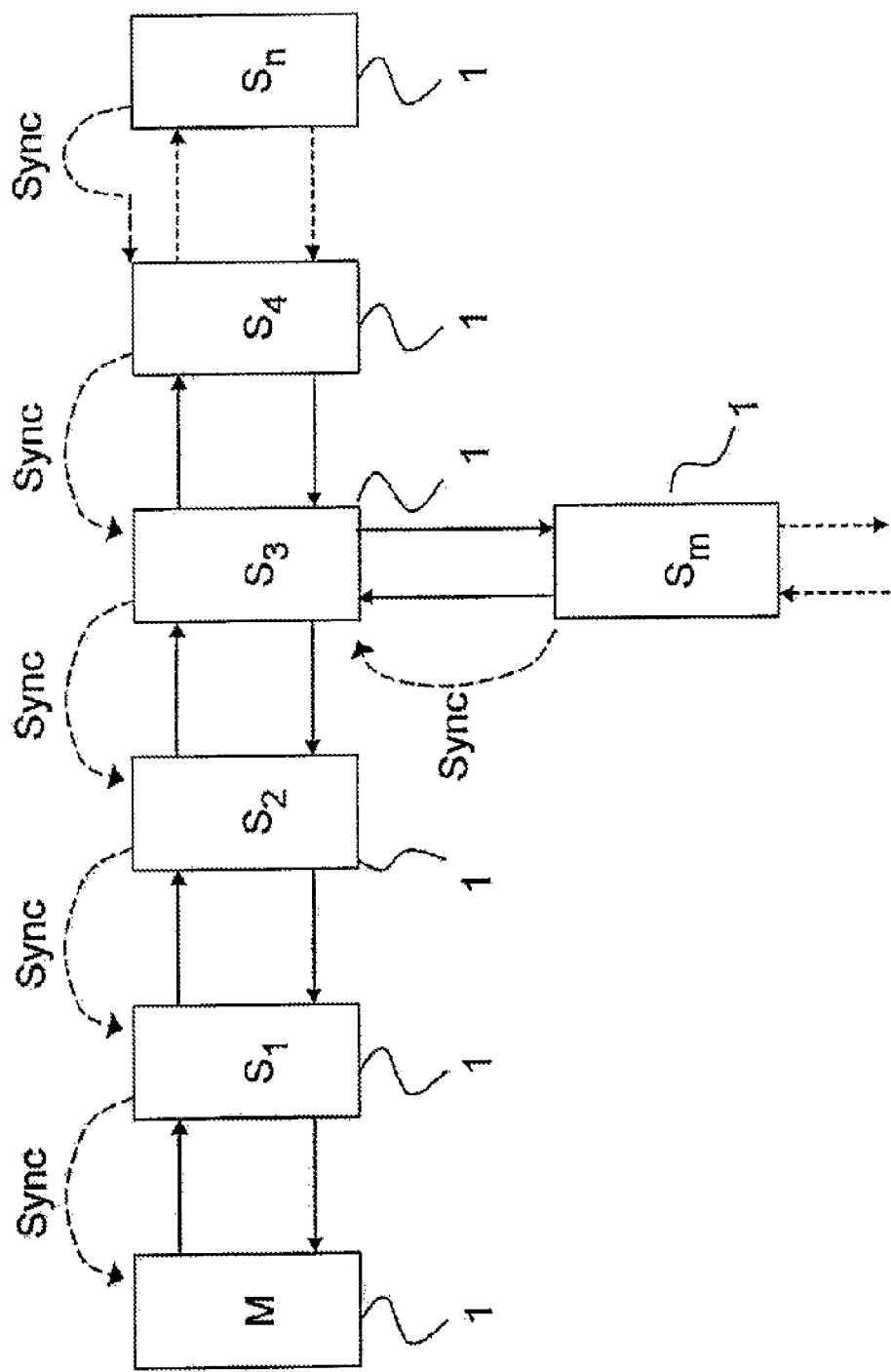
FIG. 1 shows a block diagram of a network comprising data bus parts drawn to explain the synchronization.

FIG. 1 shows a block diagram of a network comprising a multiplicity of data bus parts 1. A master of a higher order than all other data bus parts 1 is provided, on which, for example, a programmable logic control program PLC runs. This master may be a programmable logic controller PLC which is used in a manner known per se in the industrial automation process or in home automation.

The databus parts 1 are interconnected in a bus system to form a line or star or a combination thereof. Two unidirectional point-to-point connections are present in each case between two adjacent bus parts 1 in a line, so that a bidirectional, fall-duplex communication is possible between adjacent data bus parts 1. This is indicated by the arrows pointing towards a lower-order data bus part 1 for the downstream data stream D and the arrows pointing towards the higher-order data bus part 1 for the upstream data stream U.

The clock generators of the data bus parts 1 of the network must be synchronized with one another for the reliable sampling of the serial data stream in the respective data bus part 1. For this purpose, it is provided for all lower-order data bus parts, which in each case have a higher-order data bus part from which they receive a downstream data stream D, that these data bus parts 1 synchronize their internal clock generators in each case with the adjacent higher-order data bus part 1 which is located closer to the master M than the following data bus part 1. This is explained functionally by the synchronization arrows pointing in the direction of the master M.

The synchronization is not carried out as normal using a separate synchronization signal, nor using a separate synchronization line, as the separate arrows could imply. Instead, the synchronization is carried out using a detection of transitions in the downstream data stream D received at the downstream data bus input of a data bus part.

Figure 2:
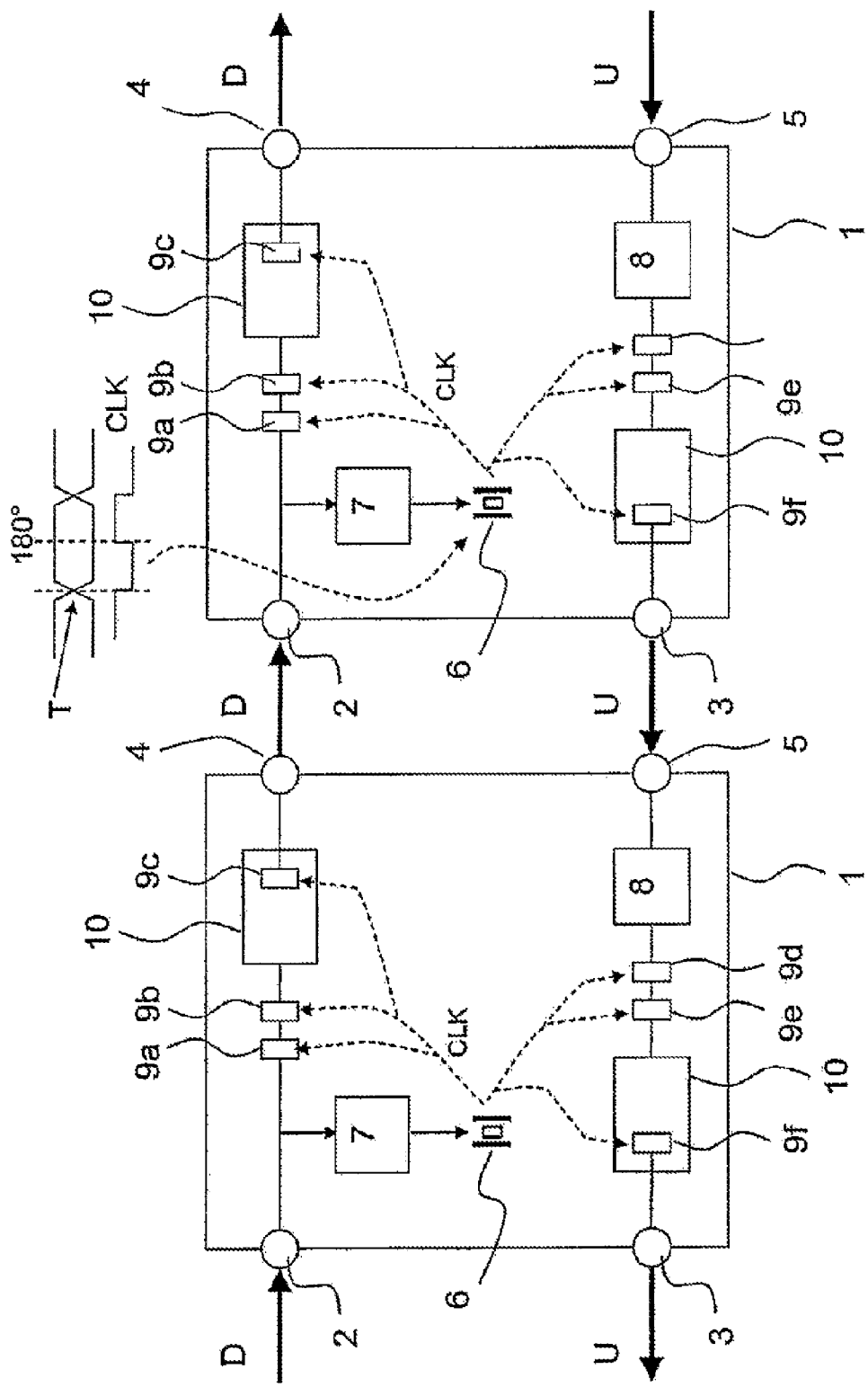
FIG. 2 shows a block diagram of a data bus part and a higher-order data bus part with a downstream and upstream data stream.

FIG. 2 shows a block diagram of two directly adjacent data bus parts 1, such as, for example, the slave $S_1$ and slave $S_2$. Each of these lower-order data bus parts 1 has a data bus input 2 for the downstream data stream D in order to receive the data stream from a higher-order data bus part 1. Furthermore, each data bus part 1 has an upstream data bus output 3 to transmit an upstream data stream U to the respective higher-order data bus part.

Furthermore, the data bus parts 1 also normally have a downstream output 4 for transmitting a downstream data stream to a respective lower-order data bus part 1. This downstream data stream may either be the unmodified downstream data stream received at the downstream data bus input 2 which contains messages from the master M to the slave $S_i$ connected to the master M (where i=1 to m or n, and i, m and n are integers). However, it is also conceivable that a data bus part 1, after reading out messages directed to it, inserts its own messages to following data bus parts 1 into the downstream data stream D itself received at the downstream data bus input 2. The synchronized and sampled data stream D arriving at the downstream data bus input 2 is either also read and forwarded unmodified or is modified and then forwarded in a processing unit 10.

In a corresponding manner, the data bus parts 1 also normally have an upstream data bus input 5 for receiving upstream data streams U of a lower-order data bus part 1. In the last data bus part 1 of a sequence of data bus parts, the downstream data bus outputs 4 and upstream data bus input 5 can be dispensed with. It is conceivable for the downstream data bus output 4 to be connected there internally in the data bus part 1 directly to the upstream data bus input 5 in order to provide a loop.

It is evident that the data bus parts 1 in each case have a clock generator 6 which is designed in a manner known per se, e.g. using a quartz component and/or a PLL loop (Phase-Locked Loop) or similar.

A synchronization unit 7, which is configured to detect transitions in the downstream data stream D received at the downstream data bus input 2, is provided to synchronize the internal clock generator 6.

For this purpose, the synchronization unit 7 can be configured to measure the phase position of the transitions in the serial downstream data stream D in relation to the internal clock either by means of a suitable electronic circuit as hardware or by means of a suitable software-supported signal processing. The synchronization unit 7 for regulating the frequency of the internal clock signal of the clock generator 6 is preferably configured so that the adjusted frequency of the internal clock signal of the clock generator 6 corresponds exactly to the frequency of the clock hidden in the downstream data stream D. The synchronization unit 7 is furthermore configured to set a defined phasing of the internal clock signal in relation to the detected transitions. The internal clock defined by the clock generator 6 is therefore set so that a defined phasing which ensures a sampling of the downstream data stream D which is as error-free as possible is provided between the edge change-overs in the downstream data stream D and the internal clock signal. The phasing should therefore be set in the range from 90° to 270° and preferably in the range from around 180° (±10%). With a phase shift of e.g. 180°, the downstream data stream D can be reliably sampled with two series-connected registers 9a, 9b precisely midway between two edge change-overs.

This is evident from the signal shown in the drawing in the downstream data stream D between the two data bus parts 1 with superimposed signal changeovers from high-level to low-level and vice versa and the clock signal CLK shown below it in the drawing with the edge changeover from low to high at 180° in relation to the transition T.

The sampled downstream data stream D is then either also read in the processing unit 10 and forwarded unmodified, or is modified and then forwarded.

The data stream D is then output via a final register 9c synchronously with the internal clock at the downstream data bus output 4. It is important for the communication that the data stream D has passed through at least two registers 9a, 9b before it is output at the downstream data bus output 4. In this way, not only the electrical amplitude of the signal is refreshed, but also the timing of the edges. The timing refresh is important in practice not only on the downstream, but also on the upstream.

As a result, all data bus parts 1 in a network therefore have exactly the same frequency set on their clock generators 6. Only the phase position between the clocks is not defined due to propagation times on the lines and the latencies of data bus parts 1. For the serial downstream data stream D, this poses no problem, since the synchronization unit 7 synchronizes the clock of the receiver for the downstream data stream with the edges in the incoming data stream D and the phase position of the clock in the transmitter of the higher-order data bus part 1 plays no part here. In practice, the data bits are output on the serial upstream data stream U to the higher-order data bus part 1, i.e. the neighbor to the left, at exactly the same frequency of the downstream data stream D as the downstream data stream is received from the higher-order data bus part 1. Due to the propagation times in the lines and the latencies of data bus parts 1, the phasing between the edges in the upstream data stream U and the local clock of the higher-order bus part of the upstream data stream U is completely undefined.

In order to be able to sample the upstream data stream U reliably between two edge changeovers also, a phasing correction unit 8 is provided in the data bus parts 8 which detects the phase position between the edge changeovers in the received upstream data stream U and the local clock of the respective data bus part 1, e.g. through measurement. The phasing correction unit 8 is then configured to delay the upstream data stream U received from the lower-order data bus part 1 in such a way that the signal transmitted with the upstream data stream U can then be sampled by the data bus part 1 precisely midway between the edge changeovers and is synchronized with the local clock of the higher-order data bus part 1 as the receiver of the upstream data stream U. Two memory registers 9d, 9e, for example, into which the upstream data streams U are successively pushed through serially after one another, can be provided for the sampling.

As shown in the drawing, the upstream data stream U can advantageously be delayed through dynamic insertion of delay elements. The data stream U is not modified, but is slightly delayed overall through suitable logic elements (propagation delay). To do this, the data stream signal is routed through the successively series-connected logic elements (e.g. LUTs or buffers).

On the upstream U, the upstream data are already received at the correct frequency due to the synchronization of the lower-order data bus part 1 with the downstream D. Only the phasing needs to be corrected by the phasing correction unit 8. To do this, the data stream is sent through a chain of digital logic elements which do not modify, but merely forward, the data stream. The forwarding is delayed by the propagation delay of the logic elements used. A chain of this type is also known as a delay line. A specific delay can be set, depending on the chain member (logic element) on which the data stream is tapped. Look-up tables LUTs in FPGAs, for example, are suitable as logic elements.

An interruption-free transmission of infinitely long data streams is possible with a network of data bus parts 1 synchronized in this way. A division into data packets is not required, as is provided e.g. in the case of Ethernet, in order to enable a new synchronization with the preamble for each data packet. As a result, no bandwidth is consumed for the preamble or similar and access to the transmission medium is possible at all times, since a preamble does not first have to be transmitted.

Furthermore, buffer memories, such as first-in first-out memories or any type of receiving or transmitting buffers, are not necessary. As a result, on the one hand, the propagation time of the data is minimized and, on the other hand, costs can be reduced due to the lower hardware outlay. The data are processed in all data bus parts up into the higher protocol layers, in part even up into the software-implemented protocol layers, due to the synchronized clock generators with which the logic and the processors of the data bus parts are supplied, clock-synchronously and deterministically precisely according to the clock.

Furthermore, an oversampling of the serial data stream is not required for the transmission and/or reception. No clock frequencies greater than the baud rate for data transmission are therefore required in the data bus parts 1. This results in a lower power dissipation and a lower noise radiation. The outlay and costs for signal processing units in the form of FPGAs (Field Programmable Gate Arrays) or ASICs (Application-Specific Integrated Circuits) are minimized due to the lower clock rates.

A further advantage is that special filler symbols or empty data bits, which are inserted in or removed from the data stream if required in other solutions in order to compensate for slightly different baud rates, are not required.

The latency in the forwarding of data on the downstream and upstream is extremely low compared with other solutions which similarly refresh the timing of the signal.

The invention claimed is:

1. A data bus part with a data bus Interface comprising:
    a downstream data bus input for receiving data from a higher-order data bus part;
    a clock generator for generating an internal clock signal for the data bus part;
    an upstream data bus input for receiving data from a lower-order data bus part;
    a synchronization unit for synchronizing the clock generator with the clock signal of the higher-order data bus part, wherein the synchronization unit is configured to detect transitions in the downstream data stream received at the downstream data input to regulate the frequency of the internal clock signal depending on the detected transitions, and to set a defined first phase position of the internal clock signal in relation to the detected transitions,
wherein
    the data bus interface is bidirectional and
    further comprises a phase position correction unit for detecting transitions in the upstream data stream provided for the reception via the upstream data bus input and for delaying this upstream data stream depending on the detected transitions, wherein the phase position correction unit is configured in such a way that a defined second phase position of the internal clock signal, which is synchronized to the transitions of the received downstream data stream, in relation to the transitions of the delayed upstream data stream is set.

2. The data bus part according to claim 1, wherein the phase position correction unit is configured to insert electrical delay elements into the upstream data stream to delay the upstream data stream.

3. The data bus part according to claim 1,
    wherein the synchronization unit and/or the phase position correction unit is configured to set a defined phasing in the range from 90° to 270° preferably from around 180°.

4. A method for synchronizing a bus part comprising:
    reception of a downstream data stream from a higher-order data bus part by a lower-order data bus part via a downstream data bus input;
    detection of transitions in the downstream data stream received at the downstream data bus input;
    synchronization of an internal clock signal of a clock generator of the lower-order data bus part depending on the detected transitions;
    setting of a defined first phase position of the synchronized internal clock signal in relation to the detected transitions of the received downstream data stream,
    reception of an upstream data stream from a lower-order data bus part by a data bus part via an upstream data bus input;
    detection of transitions in the upstream data stream received at the upstream data bus input;
    delaying of this received upstream data stream depending on the detected transitions in such a way that a defined second phase position of the synchronized internal clock signal, which is synchronized to the transitions of the received downstream data stream, in relation to the transitions of the delayed upstream data stream is set; and
    transmission of the delayed upstream data stream via an upstream data bus output to a higher-order data bus part.

5. The method according to claim 4, characterized by insertion of electrical delay elements into the upstream data stream for the delay.

6. The method according to claim 4, characterized in that the defined phase position is set in the range from 90° to 270° and preferably from around 180°.

7. A data transmission system, comprising:
    a first data bus part according to claim 1, the first data bus part further comprising a downstream data bus output; and a second data bus part according to claim 1, the second data bus part further comprising an upstream data bus output, wherein the downstream data bus input of the second data bus part is communicatively coupled to the downstream data bus output of the first data bus part, and the upstream data bus input of the first data bus part is communicatively coupled to the upstream data bus output of the second data bus part.

* * * * *